United States Patent [19]

Gardner et al.

[11] Patent Number: 5,042,824
[45] Date of Patent: Aug. 27, 1991

[54] BALANCED SHRINK FIT SEAL RING ASSEMBLY

[75] Inventors: James F. Gardner, Exeter, R.I.; Dennis A. Morin, Westport, Mass.; Jan E. Sandgren, Providence, R.I.

[73] Assignee: EG&G Sealol, Inc., Providence, R.I.

[21] Appl. No.: 478,144

[22] Filed: Feb. 8, 1990

[51] Int. Cl.5 ............................................. F16J 15/16
[52] U.S. Cl. ..................................... 277/81 R; 277/96
[58] Field of Search ................. 277/91, 111, 81 R, 96, 277/96.1, 84

[56] References Cited

U.S. PATENT DOCUMENTS

| | | | |
|---|---|---|---|
| 2,233,214 | 2/1941 | Lamont | 277/111 |
| 2,543,615 | 2/1951 | Trumpler | 277/81 R X |
| 2,948,555 | 8/1960 | Wright | 277/81 R X |
| 3,184,244 | 5/1965 | Van Vleet | 277/93 X |
| 3,749,412 | 7/1973 | Lingley | 277/81 R |
| 4,261,581 | 4/1981 | Hershey | 277/81 R X |
| 4,418,919 | 12/1983 | Wentworth | 277/81 R X |
| 4,659,092 | 4/1987 | Wallace et al. | 277/81 R X |
| 4,773,655 | 9/1988 | Lummila et al. | 277/81 R |
| 4,842,286 | 6/1987 | Heilala | 277/81 R X |
| 4,890,851 | 1/1989 | Avard et al. | 277/81 R X |

OTHER PUBLICATIONS

"Shrink Disc Connection", Baltz Company, Inc., Catalog SD 3 A-2, published Aug. 1978.

Primary Examiner—William A. Cuchlinski, Jr.
Assistant Examiner—Scott W. Cummings
Attorney, Agent, or Firm—Finnegan, Henderson, Farabow, Garrett & Dunner

[57] ABSTRACT

A balanced seal ring assembly includes an annular seal ring insert having a sealing face and a rear face opposite the sealing face, an annular retainer pressingly engaging a portion of the outer periphery of the seal ring insert and thereby retaining the seal ring insert, and a distortion compensating ring pressingly engaging another portion of the outer periphery of the ring insert. The retainer and the distortion compensating ring are spaced from each other and combine to reduce the twisting distortion of the seal ring insert. A complete balanced seal assembly comprises a stationary balanced seal ring assembly fixed to the housing and a rotary balanced seal ring assembly fixed to the shaft so that the seal faces of the assemblies are in contact.

13 Claims, 5 Drawing Sheets

BALANCED SHRINK FIT SEAL RING ASSEMBLY

BACKGROUND OF THE INVENTION

1. Field of the Invention

The present invention relates to a seal for sealing along a rotatable shaft, and more particularly to a seal which includes a retainer.

2. Description of the Related Art

Conventional face contact seals, where seal rings are held in place by a shrink fit into a retainer, exhibit seal face distortion under combined thermal and pressure effects. In the current practice of seal retainer designs, there are a number of causes of seal face distortion including (1) unbalanced shrink fit contact forces developed between the retainer bore and the seal ring outside diameter, (2) pressure forces acting on the composite seal retainer shell, causing not only radial deflection but twisting motion as well, i.e., seal face non-parallelism, (3) metal bellows radial and/or axial forces at the retainer attachment location, and (4) non-axis symmetrical forces at the point of attachment to the shaft. The shrink fit forces between the seal ring insert and retainer are often a dominant cause of face distortion. These forces are due to the substantial differential thermal expansion coefficients between typical seal insert materials, such as carbon graphite and silicon carbide, and retainer materials, such as stainless steel and Inconel. Even when the seal face is lapped after assembly in the retainer, pressure and thermal conditions in operation cause severe face distortion. When the temperature of the seal assembly rises during use, the contact stress at the retainer and seal insert are reduced, and reverse distortion will occur.

The distortion caused by the above forces and the stresses imposed on conventional seals impair the life and efficiency of the seal and also consume more power as the seal distorts under differential thermal and pressure forces. Conventional seals are also subject to considerable twisting distortion a the temperature and pressure applied to the seal varies, and they are further subject to local high stress levels at the area where the retainer press fits against the seal ring.

In addition to the above problems, the inventors have found that conventional methods of attaching the seal to the shaft often add to the distortion and stresses described above.

SUMMARY OF THE INVENTION

It is an object of the present invention to overcome the problems associated with conventional seals and their retainers and provide a face contact seal ring assembly that minimizes seal ring face distortion under combined thermal and pressure effects.

Another object is to provide a seal ring assembly with reduced twisting distortion at the sealing face.

Still another object is to provide a seal ring assembly which is designed to eliminate or reduce high stress levels in the retainer. Yet another object is to provide a seal ring assembly which provides uniform contact stress at the retainer shrink fit region between the retainer and the seal ring insert.

Still another object is to provide a seal ring assembly which is as insensitive as possible to pressure distortion of the assembly, and axial and radial attachment forces. A further object is to provide an improved, symmetrical attachment of the rotating portion of the retainer to the shaft.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

The invention provides a balanced seal ring assembly which can be used in a variety of applications. For example, a stationary seal ring assembly of the present invention can be mounted to the housing by a metal bellows assembly, and a rotary seal ring assembly of the present invention can be mounted to the shaft with a special adapter ring design made according to the present invention. The seal would be useful, by example, in the following situations: boiler feed water, hot hydrocarbon, liquid propane and liquid methane systems. The invention is an improvement in addressing all of the previously mentioned causes of seal face distortion, for both the rotating and stationary seal faces.

To achieve the objects and in accordance with the purposes of the invention, as embodied and broadly described herein, the present invention comprises a balanced seal ring assembly comprising an annular seal ring insert having an outer periphery, a sealing face, and a rear face opposite the sealing face; an annular retainer pressingly engaging a portion of the outer periphery of the seal ring insert at an interface and thereby retaining the seal ring insert; and an annular distortion compensating ring pressingly engaging another portion of the outer periphery of the ring insert, the retaining ring and the distortion compensating ring being spaced from each other and combining to reduce twisting distortion of the seal ring insert.

As embodied and broadly described herein, the invention also comprises a balanced seal ring assembly comprising an annular seal ring insert having a sealing face at one longitudinal end defined as the front surface, a rear face at the opposite end, and a circumferential outer surface with a front portion at the end proximate the sealing face and a rear portion proximate the rear face; an annular retainer for engaging the seal ring insert at the rear face and for press fitting over the rear portion of the circumferential outer surface of the seal face insert and thereby holding the seal face inert; and an annular distortion compensating ring, longitudinally spaced from the annular retainer, for press fitting over the front portion of the circumferential outer surface of the seal ring insert.

As embodied and broadly described herein, the present invention also includes a balanced seal assembly for sealing one area along a rotatable shaft from another area along the rotatable shaft comprising a stationary seal retainer fixedly attached to the housing whereby the stationary retainer does not rotate; a rotary retainer fixedly attached to the rotatable shaft; a stationary seal ring insert pressingly retained by the stationary retainer; a rotary seal ring insert pressingly retained by the rotary retainer, the stationary seal ring insert and the rotary seal ring insert being held in contact with each other; a first distortion compensating ring axially spaced from the stationary seal retainer and in pressing engagement with the stationary seal ring insert; and a second distortion compensating ring axially spaced from the rotary retainer and in pressing engagement with the rotary seal ring insert. The stationary seal retainer, the rotary retainer, the stationary seal ring insert, the rotary seal ring insert, the first distortion compensating ring, and the second distortion compensating ring cooperate to reduce distortion of the stationary and rotary seal ring inserts.

It is to be understood that both the foregoing general description and the following detailed description are exemplary and explanatory only and are not restrictive of the invention, as claimed.

The accompanying drawings, which are incorporated in an constitute a part of the specification, illustrate an example of a preferred embodiment of the invention and together with the description, serve to explain the principles of the invention.

DESCRIPTION OF THE PREFERRED EMBODIMENT

Reference will now be made in detail to the present preferred embodiment of the invention, an example of which is illustrated in the accompanying drawings. Whenever possible, the same reference numbers will be used throughout the drawings to refer to the same or like parts.

Figure 1:
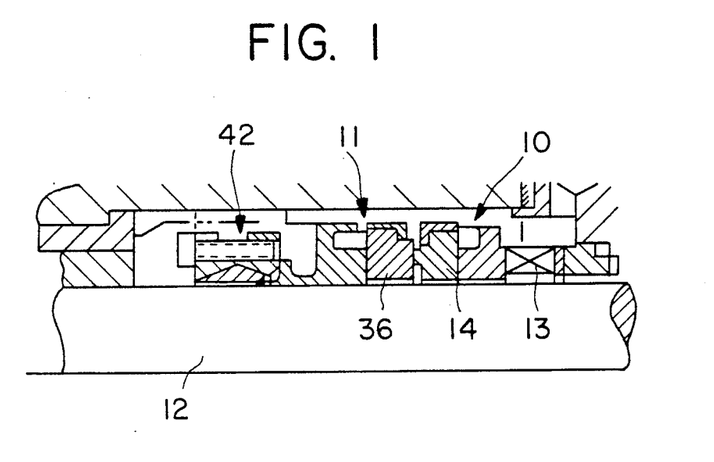
FIG. 1 is a partial cross-sectional view of the entire seal assembly of the present invention, including the stationary assembly shown in FIG. 2 and the rotary seal assembly shown in FIG. 6.

As shown generally in FIG. 1, the seal of the present invention includes a stationary seal assembly referenced generally as 10 and a rotary seal assembly referenced generally as 11. As will be understood by those in the art, FIG. 1 and the remaining figures in the application show only the upper half of the seal, the complete seal being annular in shape and surrounding shaft 12. The respective seal assemblies hold stationary seal insert 14 and rotary seal insert 36 in position and in contact with each other, thereby providing a sealing surface of their interface. The stationary assembly is fixed to the housing through a bellows 13 and associated elements, as is known in the art. The rotary assembly is fixed to the rotating shaft 12 by an attachment system 42 which will be described more fully below.

Figure 2:
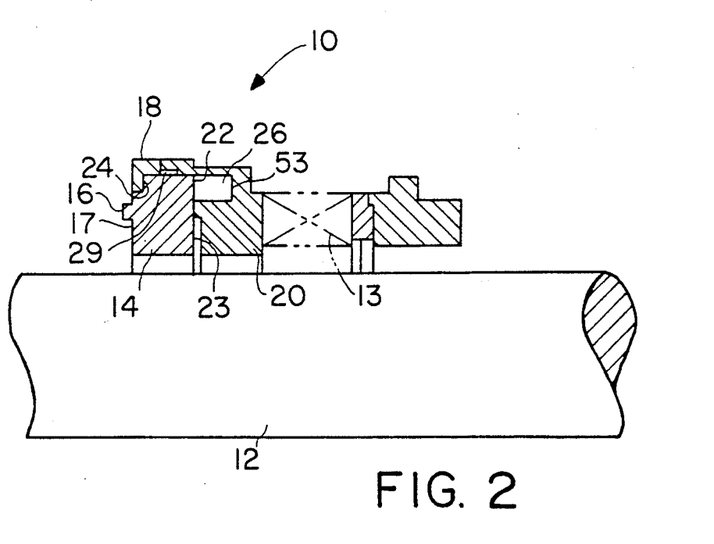
FIG. 2 is a partial cross-sectional view of a stationary retainer, seal ring insert, and distortion compensating ring assembly made according to the present invention.

As shown in FIG. 2, the stationary balanced seal ring assembly comprises a seal ring insert 14, an annular retainer 20, and a distortion compensating ring 18. The balanced seal ring assembly shown generally as 10 is locatable along a rotatable shaft 12. Ring insert 14 has sealing face 16 on front surface 17. The annular retainer 20 press fits (i.e., pressingly engages preferably by a shrink fit or alternatively by a conventional press fit) against the outer periphery of seal ring insert 14, thereby holding ring insert 14. Distortion compensating ring 18 also press fits against the outer periphery of seal ring insert 14. Retainer 20 contacts seal insert 14 in the rear portion 22 of the circumferential outer surface 29 which is axially spaced from sealing face 16 and near rear face 23. Distortion compensating ring 18 contacts insert 14 in the outer circumferential area 24 which is axially near sealing face 16.

Figure 3:
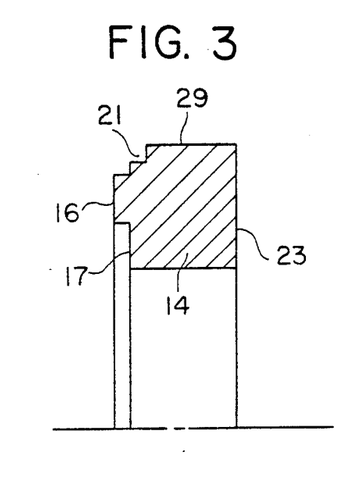
FIG. 3 is an enlarged cross-sectional view of a seal ring insert shown in FIG. 2.

As shown in FIG. 3, the seal insert 14 is annular in shape and has a front surface 17, a rear surface or face 23, and an outer circumferential area 29. In the preferred embodiment, a sealing face 16 protrudes outwardly from the front surface 17 of the seal insert. The front surface 17 may include a recess 21, in the outer circumferential area 29, to accept a portion of distortion compensating ring 18. The seal insert 14 is preferably made of carbon graphite, or alternatively carbon impregnated silicon carbide if operation in an abrasive environment is required.

Figure 4:
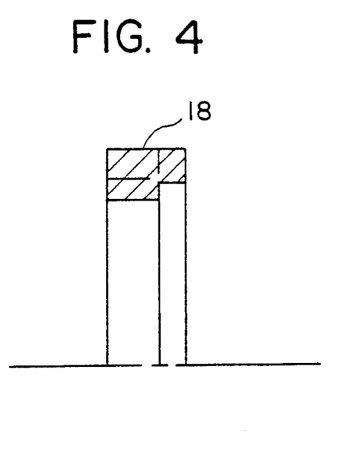
FIG. 4 is an enlarged cross-sectional view of the distortion compensating ring shown in FIG. 2.

Referring to FIG. 4, the distortion compensating ring 18 is an annular ring which may be designed to fit within the recess formed in the front surface 17 of the seal insert 14. The compensating ring 18 is sized to press fit against the outer circumference of the seal insert 14, preferably along the entire length of the compensating ring. As explained more thoroughly below, the distortion compensating ring is designed to offset the stress placed on the seal ring insert by retainer 20. The distortion compensating ring may alternatively have a rectangular cross sectional in shape. In the preferred embodiment, the compensating ring is thicker than the retaining shell ring section, because the compensating ring acts on the seal insert only through radial expansion forces, while the retaining shell ring section acts on the seal insert through a combination of radial expansion forces, and bending forces in the shell section as a result of the stiffness of the rear section of the shell.

Figure 5:
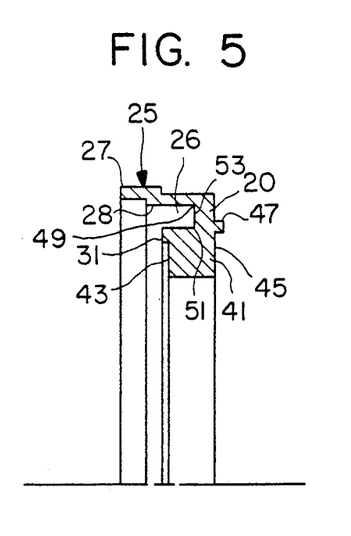
FIG. 5 is an enlarged partial cross-sectional view of the retainer shown in FIG. 2.

A preferred embodiment of stationary retainer 20 is illustrated in FIG. 5. The retainer 20 is annular in shape and has a main body 41 which includes a front surface 43 proximate the seal ring insert 14 and a rear surface 45, a portion of which engages with a bellows assembly 13. In the preferred embodiment, the front surface of the retainer 20 includes a protruding face 31 that engages the rear face 23 of the seal insert 14. Protruding face 31 is placed so that the line of action of the force between face 31 and insert 14 goes through the centroid of the insert. The rear surface also includes a protruding section 47 at which the retainer engages the bellows assembly 13, typically by weld. As a result, the main body of the retainer 20 is spaced from the seal insert 14 and the bellows assembly 13.

The retainer 20 has a longitudinally extended sleeve, referenced generally as 25, which is generally in the form of a cylinder. The sleeve 25 preferably had a first portion 28 that press fits against the rear portion 22 of the circumferential outer surface 29 of insert 14 and a second portion 27 that extends forwardly beyond first portion 28 and is radially spaced from the circumferential outer surface 29 of insert 14. The protruding face 31 of retainer 20 engages less than the entire radial height of rear face 23 of seal insert 14.

As shown in FIG. 5, the retainer 20 includes a hollow backcut region 26 that is formed between the elongated sleeve 25, the main body 41 and protruding face 31 of the retainer 20. The rearward corners 49 and 51 of the backcut region 26 are slightly rounded- in order to minimize stress. Backcut region 26 serves to isolate shrink fit contact region 28 from the rigid main body 41. As shown in FIG. 2, the backcut region is generally rectangular in cross-section and forms an annular hollow space behind the seal insert 14. The elongated sleeve 25 in combination with the wall formed by the main body 41 of the retainer 20 and the upwardly extending rear vertical wall 53 of the retainer form this hollow backcut region 26.

In the preferred embodiment of the stationary seal assembly illustrated in FIG. 2, the seal insert is made from carbon graphite, and the retainer and distortion compensating rings are made from a metal such as Inconel 718, Inconel 625, or stainless steel, in order to reduce corrosion. The distortion compensating ring and retainer are made by turning or grinding, or other methods as known in the art. The insert is sintered and then ground to shape. The distortion compensating ring and retainer are then shrink fitted around the seal insert by heating the rings preferably to approximately the same temperature as the operating temperature of the seal and then inserting the seal insert into the rings before the heated parts cool. Preferably, a shrink of 4-8 mils per inch of shaft diameter will be applied.

Once these elements are assembled, the retainer 20 in the preferred embodiment is fixed to a bellows 13 which in turn is fixed to a housing, as is known in the art. It should be recognized, however, that the retainer can be fixed directly or indirectly to the housing through a variety of structures, without departing from the spirit of the invention.

The balanced shrink fit seal of the present invention provides improved features over convention seals and their retainers. In the seal assembly of the present invention the retainer shrink fit region at portion 28 is kept close to the back face of the seal ring to minimize axial distortion, i.e., a separation of the back face of the seal insert and the retainer. The shrink fit distortion compensating ring on the opposite end of the seal insert minimizes twisting distortion at the seal face. The seal rings are sized and designed so that the contact stress due to the shrink fit is the same at the retainer shrink fit region and the distortion compensating ring shrink fit region. The extension of the retainer sleeve 25 portion 27 and the backcut region 26 cooperated to provide a uniform contact stress at the retainer shrink fit region 28 and eliminate local high stress levels in the retainer.

Reference will now be made to the rotary seal assembly illustrated in FIG. 6. As will become apparent, this seal assembly 11 is closely analogous to and mates with the stationary seal assembly 10 previously disclosed. Therefore, the discussion concerning this seal assembly will be more brief and will describe in detail only those aspects that differ from those previously described.

Figure 6:
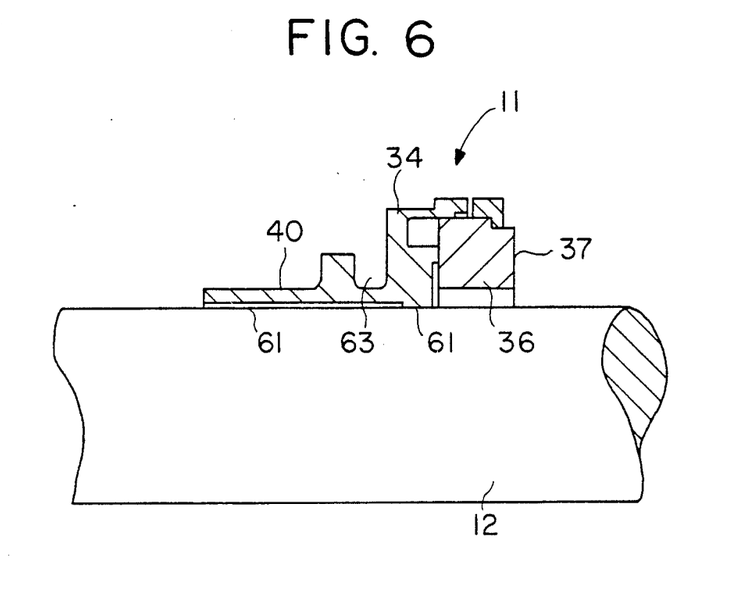
FIG. 6 is a partial cross-sectional view of a rotary retainer, seal ring insert, and distortion compensating ring assembly made according to the present invention.

As shown in FIG. 6, the rotary seal assembly 11 of the prevention invention comprises a ring retainer 34, a ring seal insert 36, and a distortion compensating ring 38. Ring retainer 34 is fixably attached to rotatable shaft 12 by an attachment system that will be described below. Seal ring insert 36 is retained by contact with retainer 34, and distortion compensator ring 38 pressingly engages seal ring insert 36. The insert is preferably made of silicon carbide, or alternatively, tungsten carbide if operation in an abrasive environment is desired. Ring retainer 34 includes an extended annular surface 40 along rotatable shaft 12 in a direction away from ring insert 36. Annular surface 40 has protrusions 61 to provide areas of increased contact pressure in order to provide sealing along shaft 12. U-shaped region 63 provides a reduced cross-section to allow flex of retainer 34 so that sealing face 37 alignment is not affected by the tolerances of shaft 12. The seal ring insert in the preferred embodiment has a flat front face 37 which in operation cooperates with the seal face 16 of the seal ring insert 14 of the stationary assembly 10.

Figure 7:
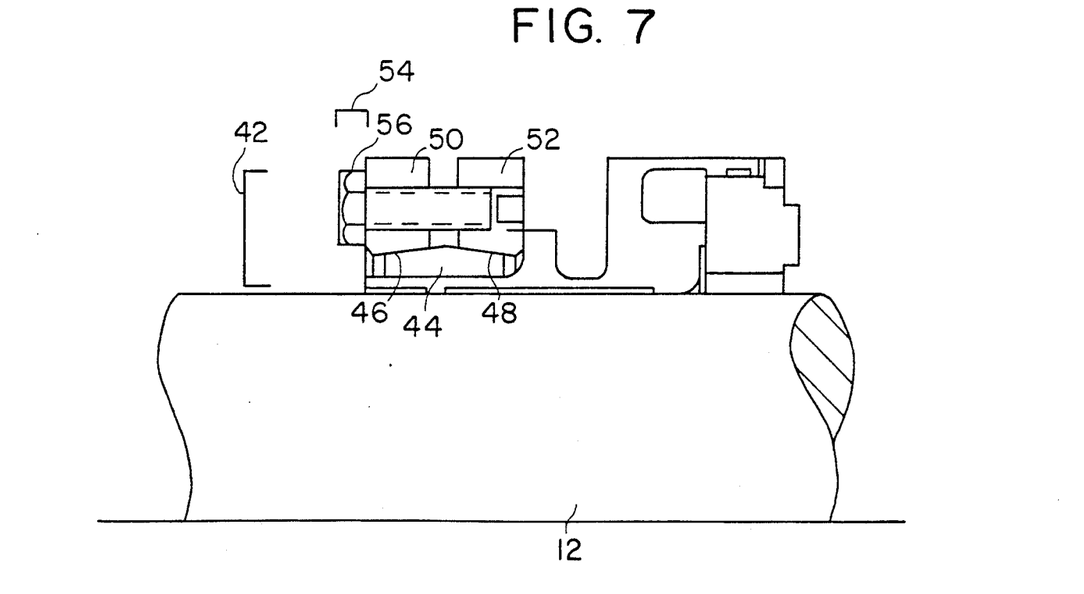
FIG. 7 is a partial cross-sectional view of the assembly for fixing the seal ring assembly onto a rotating shaft.

The present invention also includes a system 42 for fixedly attaching the mating ring retainer 34 to the shaft 12 as shown in FIG. 7. The system 42 comprises inner ring 44 having first 46 and second 48 wedge shaped outer surfaces, first 50 and second 52 wedge shaped locking collars placed over ring 44, and means 54 including bolts 56 for drawing first locking collar 60 toward second locking 52 in order to radially compress the inner ring 44 onto the extended annular surface 40 of mating ring retainer 34.

Figure 8A:
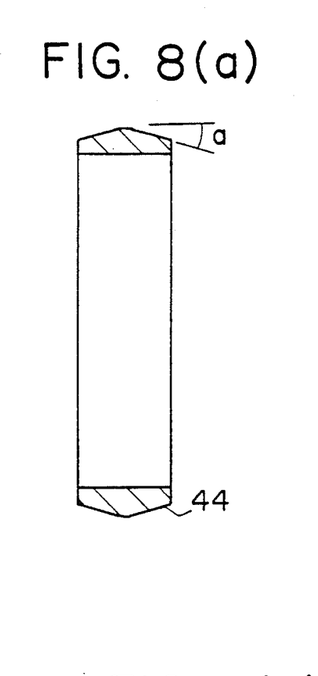
FIG. 8(a) and (b) are enlarged depictions of the inner ring of the assembly for fixing the seal ring assembly onto a rotating shaft as shown in FIG. 7.
Figure 8B:
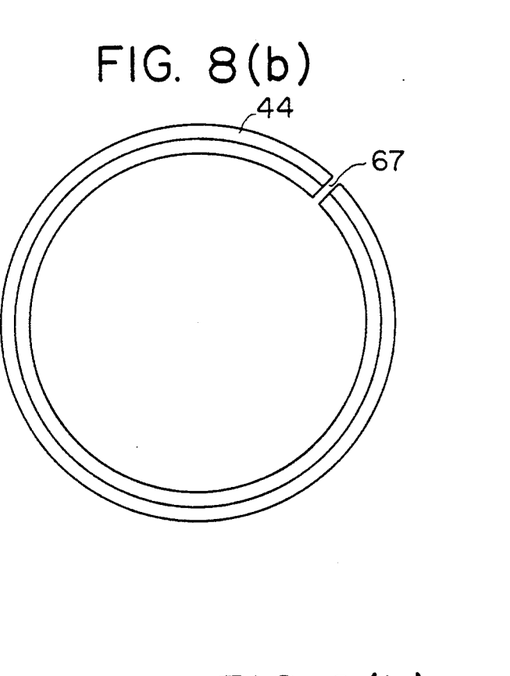
Figure 9A:
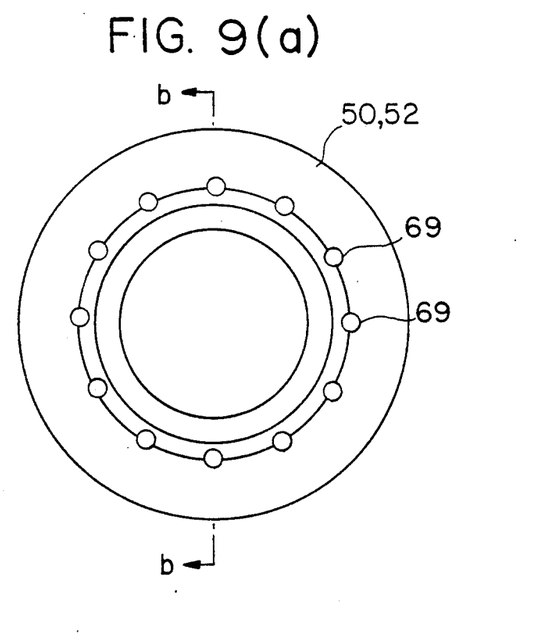
FIG. 9(a) and (b) are enlarged depictions of one of the locking collars of the assembly for fixing the seal ring assembly onto a rotating shaft as shown in FIG. 7.
Figure 9B:
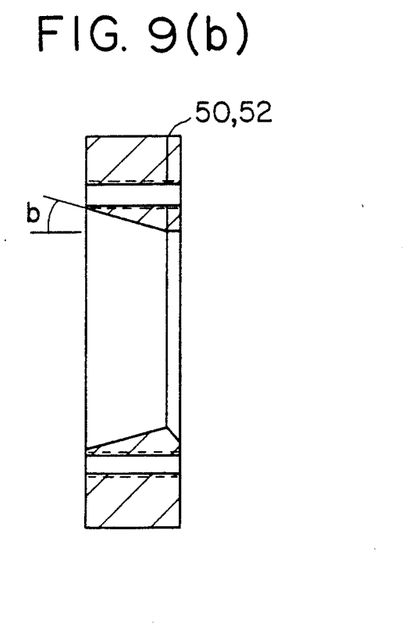

The inner ring 44 is illustrated in FIGS. 8(a) and (b), and as shown in FIG. 8(b), the ring is segmented at 67 to allow for expansion and contraction. The ring 44 is angled at an angle "a" to its axis. In the preferred embodiment this angle is 15°. The locking collar also includes a plurality of elongated apertures 69 for receiving bolts 56. In the preferred embodiment, the elongated apertures 69 in one of the locking collars are threaded to receive the bolts. When the elements are assembled as shown in FIG. 1 and the bolts are tightened, the extended annular surface 40 ring retainer 34 is pressed into fixed engagement with shaft 12. The attachment system places symmetrical force at the point of attachment of the retainer to the shaft.

The complete balanced seal assembly is illustrated in FIG. 1. The stationary seal assembly 10 and rotary seal assembly 11 are fixed to the housing and shaft, respectively, so that the sealing face 16 of the stationary seal ring and the sealing face 37 of the rotary seal ring are in contact.

The seal assembly design allows the flow of lubricant from the outside diameter toward the inner diameter, enhances the life of the seal, and reduces friction because of the self-compensating nature of the assembly. As the seal heats, the distortion compensating ring being closer to the heat source exerts relatively less pressure against the insert than the retainer. This allows a slight twisting of the seal face in which the outer diameter faces diverge further allowing entry of more coolant and lubricant, thus extending seal life and reducing power consumption.

Alternatively, in order to provide the most preferred seal, the sealing faces of seal insert 14 and seal insert 36 are designed so that a slight converging wedge is formed between the faces. The outside diameter at the interface of the sealing faces is slightly spaced, in the order of 1-3 light bands, and the faces converge at the inside diameter.

Figure 10:
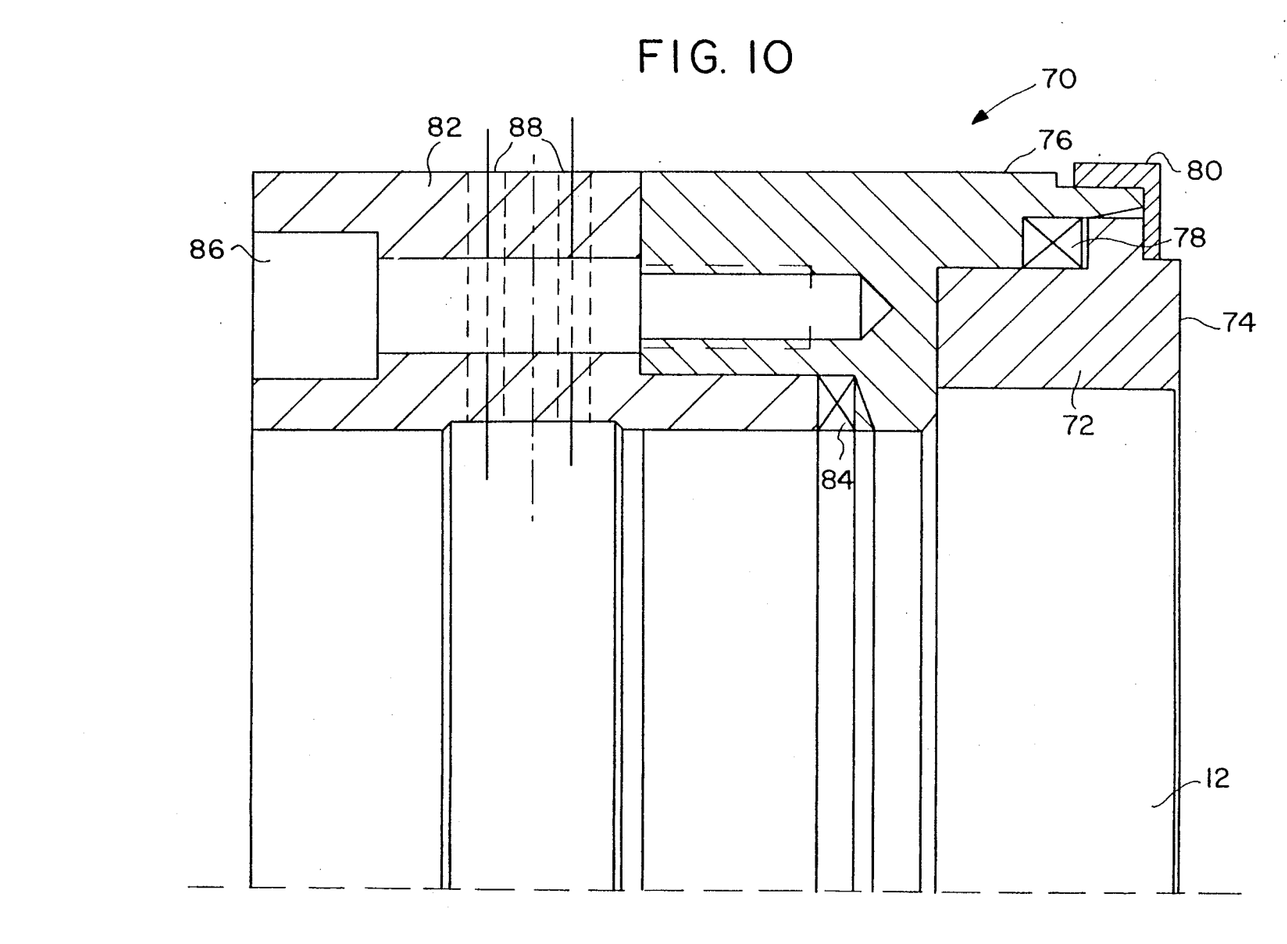
FIG. 10 is a partial cross section of a conventional rotary seal assembly.

As an alternative, the seal assembly may be designed with a conventional rotary seal retainer, shown generally as 70 in FIG. 10. A conventional rotary assembly mounted on shaft 12 consists of seal ring insert 72 with sealing face 74 the retainer is held in place by a first annular segment 76 which pressingly holds insert 72 and seals its outer edge with a first graphoil packing 78.

Insert 72 is further held in place by a cap 80 which is press fit onto first annular segment 76. A second annular segment 82 serves to seal assembly 70 to shaft 12 by compressing graphoil pack 84 when the second segment is drawn toward the first segment by a screw placed in hole 86. Finally, set screws passing through holes 88 and into shaft 12 keep assembly 70 from rotating.

While the balanced shrink fit seal of the present invention can be used in a broad variety of rotary seal applications, applicants have found that the seal is particularly useful in boiler feedwater, hot hydrocarbon, liquid propane and liquid methane systems. In testing, the seals have shown no face damage after operating in situations where conventional seals suffer catastrophic damage.

It will be apparent to those skilled in the art that various modifications and variations can be made in the balanced seal assembly of the present invention, and in construction of this seal assembly, without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A balanced seal ring assembly, comprising:
   an annular seal ring insert having a radially outer periphery, a sealing face at one axial end and a rear face opposite the sealing face;
   an annular retainer pressingly engaging a portion of the outer periphery of said seal ring insert at an interface and thereby retaining said seal ring insert; and
   means for creating a force substantially parallel to the sealing face, said force creating means including an annular distortion compensating ring pressingly engaging another portion of the outer periphery of said ring insert, said retainer and said distortion compensating ring being spaced from each other and combining to reduce twisting distortion of said seal ring insert.

2. The balanced seal ring assembly of claim 1 wherein said ring insert is pressingly contacted by said retainer in the circumferential area axially spaced from said seal face.

3. The balance seal ring assembly of claim 2 wherein said distortion compensator ring pressingly contacts said seal ring insert in the circumferential area axially proximate said sealing face.

4. The balanced seal ring assembly of claim 3 wherein said retainer includes a longitudinal sleeve that extends over and is spaced from said seal ring insert, said longitudinal sleeve extending toward the sealing face of said seal ring insert and extending beyond the interface of said outer periphery of said seal ring insert and said retainer.

5. The balanced seal ring assembly of claim 4, wherein said retainer engages a portion of the rear face of said seal ring insert and wherein a hollow backcut is formed in said retainer between said longitudinal sleeve and the interface of said retainer and said seal ring insert.

6. A balanced seal ring assembly, comprising:
   an annular seal ring insert having a sealing face at one longitudinal end defined as the front surface, a rear face at the opposite end, and a circumferential outer surface with a front portion at the end proximate the sealing face and a rear portion proximate the rear face;
   an annular retainer ring for engaging said seal ring insert at said rear face and for press fitting over the rear portion of the circumferential outer surface of said seal ring insert and thereby holding said seal ring insert; and
   means for creating a force substantially parallel to the sealing face, said force creating means including an annular distortion compensating ring, longitudinally spaced from said annular retainer ring, for press fitting over the front portion of the circumferential outer surface of said seal ring insert.

7. The balance seal ring assembly of claim 6 wherein said sealing face extends outwardly from the front surface of said seal ring insert and wherein said retainer engages only the portion of the rear face of said annular seal face insert that is aligned with said sealing face.

8. The balance seal ring assembly of claim 7 wherein the front surface has a recess at its outer periphery and wherein a portion of said distortion compensating ring extends into said recess.

9. The balance seal ring assembly of claim 6 wherein said retainer includes a longitudinally extended elongated sleeve that extends over the circumferential outer surface of said seal ring insert, said extended sleeve having a first portion that press fits against the rear portion of the circumferential outer surface of said seal ring insert and a second portion that extends forwardly beyond said first portion and is spaced from the circumferential outer surface of said ring insert.

10. The balance seal ring assembly of claim 9 wherein a third portion of said retainer engages less than all of the radial height of the rear face of said insert and wherein a hollow back cut region is formed in said retainer between said third portion and said second portion.

11. The balanced seal ring assembly of claim 10 wherein said sealing face extends outwardly from the front surface of said seal ring insert over less than the entire radial height of said front surface and wherein said third portion of said retainer is aligned with said sealing face.

12. A balanced seal assembly for sealing one area along a rotatable shaft within a housing from another area along the rotatable shaft, comprising:
   a stationary retainer fixedly attached to the housing whereby said stationary retainer does not rotate;
   a rotary retainer fixedly attached tot he rotatable shaft;
   an annular stationary seal ring insert pressingly retained by said stationary retainer, said stationary seal ring insert having a sealing face at one axial end;
   an annular rotary seal ring insert pressingly retained by said rotary retainer, said rotary seal ring insert having a sealing face at one axial end, said stationary seal ring insert and said rotary seal ring insert being held contact with each other at the respective sealing faces;
   means for creating a force substantially parallel to the sealing face of the stationary seal ring insert, said force creating means including a first distortion compensating ring axially spaced from said stationary retainer and in pressing engagement with said stationary ring insert; and means for creating a force substantially parallel to the sealing face of the rotary seal ring insert, said force creating means including a second distortion compensating ring axially spaced from said rotary retainer and in pressing engagement with said rotary seal ring insert;

whereby said stationary retainer, said rotary retainer, said stationary seal ring insert, said rotary seal ring insert, said first distortion compensating ring, and said second distortion compensating ring cooperate to reduce distortion of said stationary and rotary seal ring inserts.

13. The balanced seal assembly of claim 12 wherein said rotary retainer includes an extended annular sleeve which extends over the shaft in a direction away from said rotary ring insert and further comprises an assembly for fixing said rotary retainer onto the shaft, said assembly including:

an inner ring having first and second wedge-shaped outer surfaces placed over the extended annular surface of said retainer;

first and second locking collars having wedge-shaped inner surfaces positioned over said first and second wedge-shaped outer surfaces of said inner ring; and means for drawing said first locking collar towards said second locking collar so that said inner ring is radially comprised onto the extended annular surface of said rotary retainer.

* * * * *